W. E. SIMONDS.
TELEGRAPH WIRE INSULATOR.
No. 3,499. Reissued June 8, 1869.
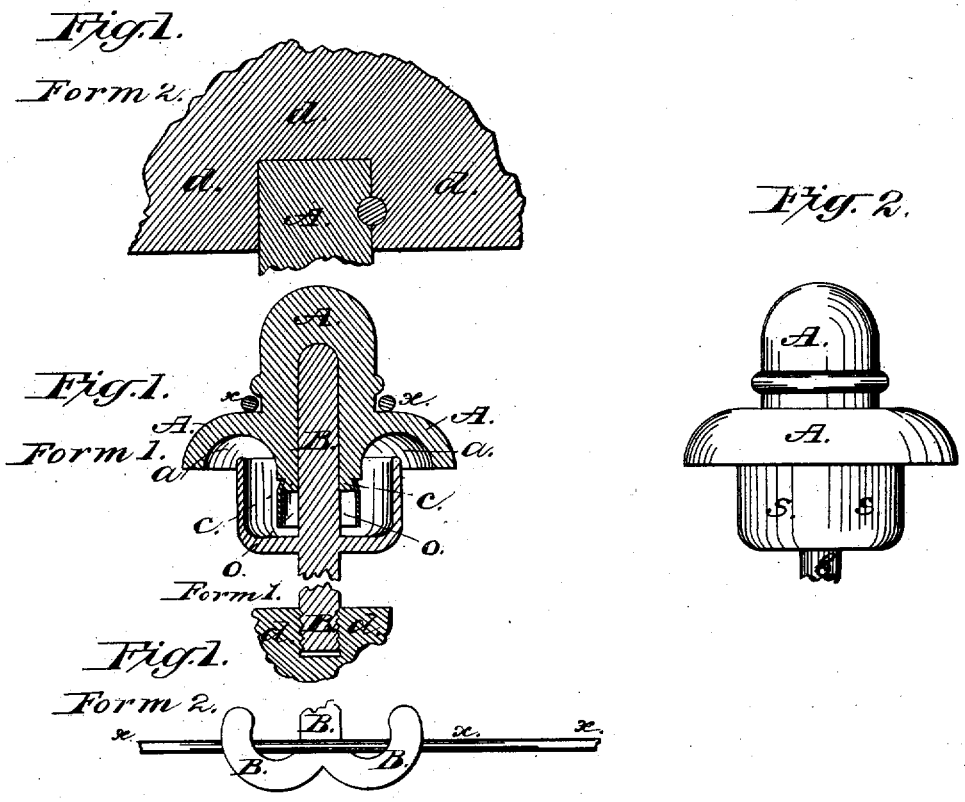
Witnesses:
George H. Sill
Edwin E. Marrow
Inventor:
W. E. Simonds.
THE NORRIS PETERS CO., PHOTO-LITHO., WASHINGTON, D. C.

UNITED STATES PATENT OFFICE.

W. EDGAR SIMONDS, OF HARTFORD, CONNECTICUT.

IMPROVEMENT IN TELEGRAPH-INSULATORS.

Specification forming part of Letters Patent No. 71,418, dated November 26, 1867; Reissue No. 3.499, dated June 8, 1869.

*To all whom it may concern:*

Be it known that I, W. EDGAR SIMONDS, of Hartford, in the county of Hartford and State of Connecticut, have invented a new and useful Improvement in Telegraph-Insulators; and I declare the following to be a full and exact description thereof, reference being had to the accompanying drawings, and to the letters of reference marked thereon, forming a part of this specification.

Figure 1 is a central vertical section of my improvement. Fig. 2 is a detached view of the device in one form.

The letter *x* represents the telegraph-wire. The same letters indicate the same parts in all the figures.

The insulators in common use are generally of two kinds—one in which the wire is fastened directly to the insulator proper, which insulator proper is supported on a peg or standard, and another where the wire passes through a hook depending from the insulator proper, which insulator proper is fastened to the pole or cross-arm. My invention is applicable to both these kinds, and probably to other modifications.

The end aimed at in making insulators is to so construct them that somewhere on the surface of the insulator proper, intervening between the wire and the point of attachment and support of the whole device, a dry ring or space shall be kept at all times, thus preventing the escape or waste of electricity at each insulator.

I will first describe the application of my invention to that form of insulators where the insulator proper is supported upon a peg or standard, which I designate in this specification as "Form 1."

The insulator proper, A, may be of glass, hard rubber, flint, or other proper non-conducting material. A groove, *a*, runs entirely around the bottom of the insulator proper. A shoulder, *c*, also runs entirely around the bottom of the insulator proper, made largest at the bottom, that the rubber band (hereinafter described) may take fast and permanent hold upon it.

B is the standard or peg which supports the insulator proper, at its foot fastened to the pole or cross-arm *d*. This standard, I think, is best made of malleable iron, and when so made the cup *s* is cast upon it, whose edge or lip fits up into the groove *a*. It must not touch the insulator proper, but its edge and the sides of the groove must interlap. If the standard be made of wood or the like then the cup *s* may be made separate, of suitable material, and fitted to the standard. The production of this interlapping cup and groove forms an essential part of my invention. By it descending, ascending, or lateral-moving moisture, such as is often driven by the winds, is prevented from reaching that portion of the bottom of the insulator which is within the circle of the cup. If any moisture at all reaches this portion of the bottom of the insulator proper it must, of necessity, be the moisture of condensation. To obviate this last difficulty there is a thin thimble or band, *o*, of india-rubber or other flexible elastic non-conducting material, which snaps onto the shoulder *c*. This band should be as thin as is compatible with the requisite strength—say one thirty-second of an inch in thickness. At the top, however, it should be twice as thick, that it may snap smartly on the shoulder. The idea in putting this band here is, first, to interpose further insulating-surface between the wire and standard; and, next, to use rubber or similar material for this purpose, in order that its gummy and somewhat unctuous nature may cause any moisture of condensation that may possibly settle upon its surface to crisp up into minute globules, and not form a continuous sheet of moisture for the escape of electricity. The reason for making this band thin is that its temperature may vary with the slightest changes of the temperature of the surrounding atmosphere, and thus tend to prevent condensation. This is another essential part of my invention.

I have fully described my invention, and it now remains to show that the same invention is properly applicable to the other common form of insulator.

In Fig. 1, in the stead of rounding-off the top of the insulator proper, as shown in Form 1, extend it, as in Form 2, and fasten it to the cross-arm or pole by any of the common methods. At the same time, have the lower extremity of B terminate in a hook for the wire *x* to pass through, as shown also in Form 2, premising that B is firmly fastened into A by means of a screw-thread or otherwise. My invention is applied to this form of insulator without the change of a single element of my invention.

I may as well state that I claim nothing on the shape of the top of the insulator; neither of the lower end of B.

I claim as my invention—

1. The shoulder *c*, or its equivalent, formed upon the body of an insulator, for the purpose of supporting the rubber band *o*, or its equivalent, in combination with the rubber band *o*, or its equivalent, attached to and supported by said shoulder, the whole arranged, constructed, and operating as described, for the purpose described.

2. The combination of the insulator proper, A, the rubber band *o*, and the cup *s*, together with the standard or shank supporting it, the whole constructed, arranged, and operating as and for the purposes described.

Dated February 11, 1869.

W. E. SIMONDS.

Witnesses:
R. D. HUBBARD,
EDWIN E. MARVIN.